Fig. 3
Fig. 4
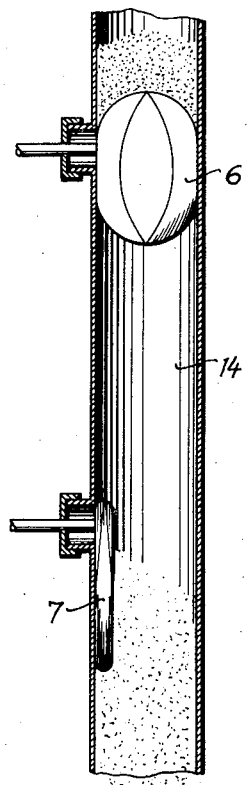
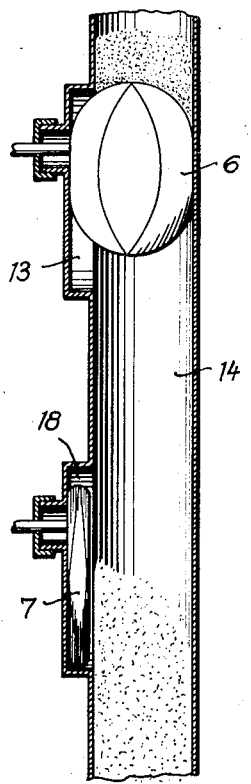

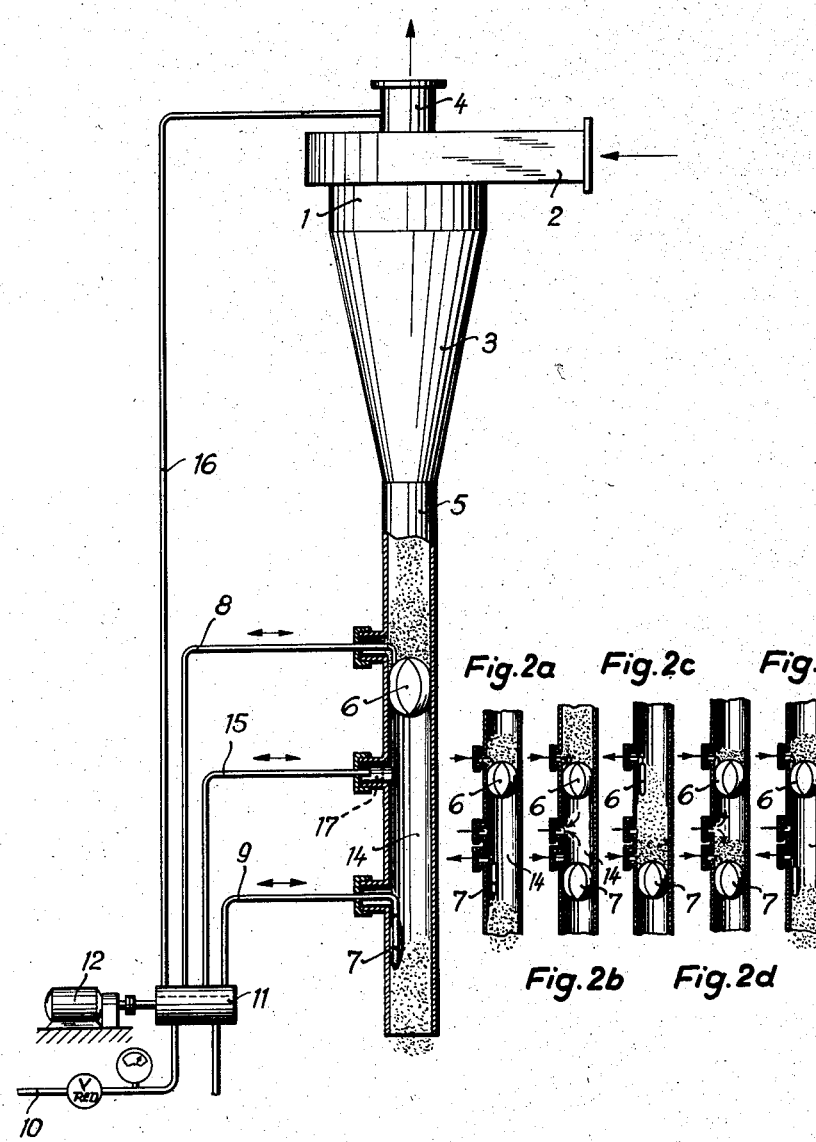

2,889,892

LOCK FOR THE DISCHARGE OF SOLIDS SEPARATED FROM GASEOUS MEDIA BY MEANS OF CYCLONES

Franz Schaub and Winfried Drope, Oberhausen-Holten, and Wilfried von Hoffmann, Offenbach am Main, Germany, assignors to Ruhrchemie-Aktiengesellschaft, Oberhausen-Holten, Germany Application July 2, 1957, Serial No. 669,636

Claims priority, application Germany July 7, 1956

1 Claim. (Cl. 183—85)

In separating solids from gases by means of cyclones, the discharge device for the separated solid materials must be sealed gas-tight against the surrounding atmosphere since even small amounts of air or gas penetrating from below into the discharge pipe of the cyclone considerably reduce the separating effect of the device. Up to the present, the discharge of the separated solid materials from their enclosed collecting vessel has generally been effected by means of rotary locks or valves. Rotary locks or valves of this kind, however, cannot be kept sufficiently leakage-tight, since they are subject to considerable wear particularly when materials having an abrasive action are involved. To overcome these difficulties, various and in part relatively complicated discharge locks have been suggested, which, for example, use flat slides as sealing elements. Devices of this kind are relatively complicated and have not proved satisfactory.

It is also known to seal the discharge pipe of cyclones by means of annular hollow bodies of resilient material, such as rubber or similar materials. These annular hollow bodies of rubber enclose a central round body installed in the cyclone discharge pipe. When compressed air is introduced, the resilient hollow body engages the round body with a tight fit, thus providing a seal for the annular discharge cross section. This involves the disadvantage that only a relatively narrow annular slot is available for the discharge of the separated solid materials, which is readily plugged by the pulverulent material due to bridging, thus preventing trouble-free operation of a lock of this kind.

It has been found that these disadvantages will be completely avoided when two substantially balloon-shaped hollow bodies of rubber or other resilient material are installed in the discharge pipe of the cyclone body or casing and are alternately filled or emptied by a gaseous or liquid sealing medium and enclose a chamber located between said hollow bodies. The hollow bodies may be made of rubber, especially a heat-resistant and chemical-resistant type of rubber. It is also possible to use hollow bodies of textile or plastic materials, which, if necessary, have been made gas-tight by impregnation with rubber.

In normal operation of the cyclone, the upper hollow body is inflated to engage the inner wall of the discharge with a gas-tight fit. The solid materials separated in the cyclone by centrifugal action accumulate above the inflated hollow body in the discharge pipe and in the conical bottom of the cyclone adjoining the discharge pipe. After a certain time, the lower hollow body is also inflated, so that the two hollow bodies enclose with a tight fit a chamber in which atmospheric or, as the case may be, superatmospheric or subatmospheric pressure prevails due to the preceding discharge operation. After inflating both of the sealing bulbs a subatmospheric pressure which corresponds to that prevailing in the cyclone may be applied to this chamber.

Thereafter, the sealing medium is removed from the upper hollow body to make it collapse, thus giving the pipe cross-sectional area free for passage of the solid materials which then accumulate on the inflated lower hollow body. If this state is reached, the upper hollow body is again inflated and pressed against the inner wall of the discharge pipe. Thereafter, the lower hollow body is emptied permitting the solid material to freely drop downwardly. The solid materials may also be passed directly into reaction vessels in which superatmospheric pressure or partial vacuum prevails. The periodical evacuation according to the invention of the chamber enclosed between the two inflated hollow bodies overcomes any difficulty which may be encountered due to differences in gas pressure.

An example of an embodiment of the cyclone lock according to the invention is shown on the appended drawing, but it should be understood that this is given by way of illustration and not of limitation, and that many changes in the details can be made without departing from the spirit of the invention.

In the drawings:

Fig. 1 shows the lock of the invention in connection with a cyclone,

Figs. 2a, 2b, 2c, 2d and 2e illustrate the different operating cycles of the new cyclone lock;

Fig. 3 shows a part of the device on an enlarged scale, and

Fig. 4 illustrates a modified embodiment of the lock.

Referring to the drawings, 1 designates a cyclone of conventional construction as used for separating granular or chip-shaped solid materials entrained or pneumatically conveyed by a gas current (air). The gas to be purified is introduced through a line 2 terminating tangentially in the cyclone. Due to the centrifugal acceleration thereby produced, the solid particles contained in the gaseous medium are centrifuged out, so that they drop downwardly in the conical bottom 3 adjoining the tangential line 2 while the gaseous medium freed from the solid particles escapes in upward direction through a line 4 to be returned, as the case may be, into the cycle of the particular operation.

At its lower end, the conical bottom 3 is connected to a vertical pipe 5 extending downwardly. Installed in this pipe are two bulbs 6 and 7, consisting of rubber or similar resilient materials, which are spaced at an adequate distance of the pipe to enclose a certain space or a vessel of any shape desired. The bulbs 6 and 7 are connected to lines 8 and 9, through which a gaseous or liquid medium, the so-called sealing medium, can be admitted and sucked off. The sealing medium, which will generally be air, is, for example, introduced through a line 10 equipped with a reducing valve and a pressure gauge. It is then passed through an automatic valve-controlling device 11 (controller) which is driven by a small electric motor 12 or any other suitable device effecting and disconnecting the necessary line connections at relatively slow cycles adapted to the particular operating conditions. In this manner, the sealing medium is passed into the respective inflatable sealing bodies 6 and 7 and sucked off therefrom after adequate time intervals.

During the separation of solid particles from the gaseous medium entering through line 2, i.e., while solid particles accumulate in the discharge pipe 5, the bulb 6 is filled with the sealing medium (see Fig. 2a) so that it engages the inner wall of the pipe 5 with a gas-tight fit. During this time, the solid particles separated from the gas being purified accumulate above the sealing element 6. Thereby, return of air into the cyclone 1 is safely avoided.

As soon as a sufficient quantity of solid particles has accumulated above the bulb 6, the control deivce 11 allows the sealing medium to flow into the rubber bulb 7, so that the bulb 7 likewise engages the inner wall of the pipe 5 with a gas-tight fit (see Fig. 2b). Thereby, a closed chamber is formed between the bulbs 6 and 7.

Normal atmospheric pressure, or, as the case may be, an elevated pressure prevails in chamber 14 between the inflated bulbs 6 and 7 from previous discharge operations, while a certain partial vacuum is obtained in the hopper 3 due to the centrifugal action of the cyclone. This differential pressure could have an undesirable effect when the bulb 6 is deflated (Fig. 2c), in that air or gas filling the chamber 14 might penetrate into the cyclone thus reducing the efficiency of the same. Therefore, the controller 11, via a line 15, connects the chamber 14 with a vacuum source, especially with a line 16 which in turn is connected to the vent gas line 4 of the cyclone 1. Thereby, about the same or a somewhat lower pressure than that prevailing in the cyclone 1 is produced in the chamber 14 between the bulb 6 and 7. Thus, a backflow of gas into the cyclone 1 cannot occur when the bulb 6 is deflated (Fig. 2c).

By appropriate switch positions on the controller 11, the bulb 6 is now deflated (Fig. 2c), thus allowing the solid particles accumulated in the pipe 5 and in the conical bottom 3 to drop onto the still inflated bulb 7. Thereafter, the bulb 6 is inflated again and the chamber between the bulbs is brought to atmospheric pressure or a still higher pressure by means of line 15 and the controller 11 (Fig. 2d). The bulb 7 is subsequently emptied from the sealing medium (Fig. 2e) and the solid particles present in the pipe chamber 14 can now freely drop downwardly or be transferred into a reaction vessel which is under any pressure desired. After the discharge pipe 5 is completely emptied, the condition as represented in Fig. 1 is obtained and the operating cycles described will start again.

When sucking off the gases present in the pipe chamber 14, solid particles may be entrained and may cause plugging of the line 15. Therefore, a filter 17 is provided before the opening of the line 15, retaining all of the solid particles. In discharging the solid particles in the manner illustrated on Fig. 2d, compressed air is introduced for a short time through line 15 by means of the controller 11. This compressed air blows off all of the solid particles deposited on the filter, causing them to drop down with the other solid particles.

A particular advantage of the discharge lock according to the invention resides in the fact that the rubber bulbs 6 and 7 used for sealing the pipe cross-sectional area, when empty, represent practically no obstacle to the passage of the solids through the pipe as may be seen from Fig. 3, which is on an enlarged scale. Only a small fraction of the cross section of the pipe is occupied by the bulb 7 when collapsed.

This disadvantage may also be overcome by providing recesses 13 and 18 at the points where the bulbs 6 and 7 are attached. These recesses take up the deflated bulbs as is shown in Fig. 4 for the bulb 7. In this case, the entire pipe cross-sectional area is available for discharging the solid particles.

When gases are used to inflate the bulbs 6 and 7, a vacuum may be applied to accelerate deflation. The suction line 16 of the cyclone may, for example, be used for this purpose.

The lock according to the invention is not limited to use with cyclones but can be used wherever solid and finely divided materials are to be transferred from one space into another. Different gas pressures may prevail in these spaces and different gaseous media may be contained therein. It is possible by means of the chamber 14 between the two sealing bulbs 6 and 7 to compensate differential pressures and to introduce or remove inert sealing gases which prevent intermixing of the gas media present in the two reaction vessels.

The device according to the invention may, for example, be used for transferring catalysts from a stock vessel into a reaction chamber and from there into a regeneration zone. In a similar manner, it is possible to transfer moist granular materials into a drying chamber where partial vacuum prevails, and from there into a cooling zone which operates under a higher pressure. The lock according to the invention may be used to transfer absorbents, e.g. activated charcoal, activated silica or activated alumina, used for absorbing gas constituents, into a degassing chamber where the pure gas constituents are desorbed, and from where they are returned through an additional lock into the process cycle.

What we claim is:

In a centrifugal separator for withdrawing solid particles from gaseous media, a lock arranged in a discharge tube of said centrifugal separator, said lock comprising two inflatable bulbs made of resilient material, capable of being alternately inflated with a fluid medium, means for conducting said fluid medium to said bulbs for inflation thereof and for withdrawing said medium therefrom, respectively, controller means for controlling said admission and withdrawal of the fluid medium to the bulbs, said bulbs when inflated being of a size completely sealing the cross section of said discharge tube and being so arranged therein one above the other in spaced position as to completely enclose a space therebetween, and two recessed portions in the wall of said discharge tube, each recess provided adjacent one of said bulbs and of a size corresponding to a bulb in deflated state, whereby the deflated bulb is received into its associated recess so as to leave the entire cross section of the tube free for passage of solid particles therethrough.

References Cited in the file of this patent

UNITED STATES PATENTS

| 1,033,164 | Fahrney | July 23, 1912 |
| 1,906,151 | Goodman | Apr. 25, 1933 |
| 1,922,003 | Shuman | Aug. 8, 1933 |
| 2,708,489 | Stokoe | May 17, 1955 |
| 2,760,595 | Pynor | Aug. 28, 1956 |
| 2,792,910 | Redniss | May 21, 1957 |
| 2,804,170 | Pynor | Aug. 27, 1957 |

FOREIGN PATENTS

| 177,277 | Austria | Jan. 11, 1954 |
| 904,261 | Germany | Feb. 18, 1954 |
| 160,392 | Australia | Jan. 5, 1955 |